(12) United States Patent
Wu et al.

(10) Patent No.: US 11,678,734 B2
(45) Date of Patent: Jun. 20, 2023

(54) METHOD FOR PROCESSING IMAGES AND ELECTRONIC DEVICE

(71) Applicant: BEIJING DAJIA INTERNET INFORMATION TECHNOLOGY CO., LTD., Beijing (CN)

(72) Inventors: Shanshan Wu, Beijing (CN); Paliwan Pahaerding, Beijing (CN); Ni Ai, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/829,743

(22) Filed: Jun. 1, 2022

(65) Prior Publication Data

US 2022/0301341 A1   Sep. 22, 2022

Related U.S. Application Data

(63) Continuation of application No. 17/105,186, filed on Nov. 25, 2020, now Pat. No. 11,367,307.

(30) Foreign Application Priority Data

Nov. 25, 2019   (CN) .......................... 201911168483.5

(51) Int. Cl.
*G06T 5/00* (2006.01)
*A45D 44/00* (2006.01)
(Continued)

(52) U.S. Cl.
CPC .............. *A45D 44/005* (2013.01); *G06T 7/11* (2017.01); *G06V 10/764* (2022.01); *G06V 10/82* (2022.01);
(Continued)

(58) Field of Classification Search
CPC . G06T 2207/30201; G06T 2207/20081; G06T 2207/10016; G06T 2207/20221;
(Continued)

(56) References Cited

U.S. PATENT DOCUMENTS

| 10,002,286 B1 | 6/2018 | Prabhu |
| 11,367,307 B2* | 6/2022 | Wu ...................... G06V 40/171 |

(Continued)

FOREIGN PATENT DOCUMENTS

| CN | 108932693 A | 12/2018 |
| CN | 109360222 A | 2/2019 |

(Continued)

OTHER PUBLICATIONS

China National Intellectual Property Administration, Notification to grant patent right for invention of Chinese application No. 201911168483.5 dated Oct. 8, 2022, which is foreign counterpart application of this US application.

(Continued)

*Primary Examiner* — Quan M Hua
(74) *Attorney, Agent, or Firm* — Knobbe, Martens, Olson & Bear, LLP

(57) ABSTRACT

Provided is a method for processing images. The method can include: acquiring a target face image, and performing face key point detection on the target face image to acquire a face key point detection result; determining a face visible area which is not subject to an occluder and a face invisible area which is subject to the occluder in the target face image; and acquiring a target fusion image by fusing a virtual special effect and a face part matched in the target face image based on the face key point detection result, the face visible area and the face invisible area.

15 Claims, 8 Drawing Sheets

(51) Int. Cl.
*G06T 7/11* (2017.01)
*G06V 40/16* (2022.01)
*G06V 10/764* (2022.01)
*G06V 10/82* (2022.01)

(52) U.S. Cl.
CPC .......... *G06V 40/165* (2022.01); *G06V 40/168* (2022.01); *G06V 40/171* (2022.01); *G06T 2207/20081* (2013.01); *G06T 2207/20221* (2013.01); *G06T 2207/30201* (2013.01)

(58) Field of Classification Search
CPC ......... G06T 7/246; G06T 11/00; G06T 19/20; G06T 2207/10028; G06T 2219/2012; G06T 7/11; G06T 7/20; G06T 15/04; G06T 2207/20084; G06T 2207/30196; G06T 7/70; G06T 7/74; G06T 11/001; G06T 11/40; G06T 11/60; G06T 19/003; G06T 2207/10048; G06K 9/00; G06K 9/62; G06V 10/764; G06V 40/165; G06V 40/171; G06V 10/82; G06V 10/774; G06V 40/167; G06V 40/168
See application file for complete search history.

(56) References Cited

U.S. PATENT DOCUMENTS

| | | | |
|---|---|---|---|
| 2015/0228119 A1 | 8/2015 | Osterhout et al. | |
| 2015/0243324 A1* | 8/2015 | Sandrew | H04N 13/266 |
| | | | 386/278 |
| 2018/0075523 A1* | 3/2018 | Sartori Odizzio | G06Q 30/0643 |
| 2018/0075524 A1* | 3/2018 | Sartori Odizzio | G06F 3/04845 |
| 2018/0285630 A1* | 10/2018 | Han | G06V 40/172 |
| 2019/0392634 A1* | 12/2019 | Lin | G06V 40/166 |
| 2020/0294243 A1 | 9/2020 | Ll et al. | |
| 2021/0158021 A1 | 5/2021 | Wu | |
| 2021/0279503 A1 | 9/2021 | Qi et al. | |

FOREIGN PATENT DOCUMENTS

| | | | | |
|---|---|---|---|---|
| CN | 109522863 A | | 3/2019 | |
| CN | 109816741 A | | 5/2019 | |
| CN | 109960974 A | * | 7/2019 | ......... G06K 9/00228 |
| CN | 110070056 A | | 7/2019 | |
| CN | 110189340 A | | 8/2019 | |
| CN | 110197462 A | | 9/2019 | |
| CN | 110458752 A | | 11/2019 | |

OTHER PUBLICATIONS

Hengli Huang et al., A Technology of Virtual Glasses Try-on Based on Face Detection, Information & Communications No. 6, Jun. 15, 2017, pp. 63-66.

Siyang Yan, Research and Application Based On Face Feature Ectraction, Chinese Master's Theses Full-text Database Information Technology Series No. 03, Mar. 15, 2018, pp. 1138-1868, English translation of abstract provided.

Junying Gan et al., A study for facial beauty prediction model, 2015 International Conference on Wavelet Analysis and Pattern Recognition (ICWAPR), Oct. 12, 2015, pp. 8-13.

* cited by examiner

METHOD FOR PROCESSING IMAGES AND ELECTRONIC DEVICE

This application is a continuation application of U.S. application Ser. No. 17/105,186, filed on Nov. 25, 2020 and claims priority to Chinese Patent Application No. 201911168483.5, filed on Nov. 25, 2019, and entitled "IMAGE PROCESSING METHOD AND DEVICE, ELECTRONIC EQUIPMENT AND STORAGE MEDIUM", the disclosures of which are herein incorporated by reference in their entireties.

TECHNICAL FIELD

The present disclosure relates to the technical field of computer graphics, and in particular, relates to a method for processing images and an electronic device.

BACKGROUND

With the wide popularization of smart terminals and the gradual improvement in performance of terminals, shooting with smart terminals has become one of the important means for people to record beautiful moments in daily life. In order to enhance beauty of the image, a virtual special effect may be added to face parts of the face image. For example, a makeup special effect may be applicable on the face parts of the face image. The makeup special effect applied on the face parts herein may refer to a virtual eyebrow special effect added to eyebrows, a virtual beard special effect added between the nose and mouth, and the like.

SUMMARY

The present disclosure provides a method for processing images and an electronic device.

According to one aspect of embodiments of the present disclosure, a method for processing images is provided. The method includes:

acquiring a target face image, and performing face key point detection on the target face image; acquiring a first fusion image by fusing a virtual special effect and a face part matched in the target face image based on a face key point detection result; acquiring an occlusion mask of the target face image, wherein the occlusion mask is configured to indicate a face visible area which is not subject to an occluder and a face invisible area which is subject to the occluder in the target face image; and generating a second fusion image based on the occlusion mask and the first fusion image.

According to another aspect of embodiments of the present disclosure, an electronic device is provided. The electronic device includes:

a processor; and a memory configured to store at least one computer program including at least one instruction executable by the processor; wherein the at least one instruction, when executed by the processor, causes the processor to perform a method including: acquiring a target face image, and performing face key point detection on the target face image; acquiring a first fusion image by fusing a virtual special effect and a face part matched in the target face image based on a face key point detection result; acquiring an occlusion mask of the target face image, wherein the occlusion mask is configured to indicate a face visible area which is not subject to an occluder and a face invisible area which is subject to the occluder in the target face image; and generating a second fusion image based on the occlusion mask and the first fusion image.

According to yet another aspect of embodiments of the present disclosure, a non-transitory computer-readable storage medium storing at least one computer program including at least one instruction provided. The at least one instruction, when executed by a processor of an electronic device, causes the electronic device to perform a method including:

acquiring a target face image, and performing face key point detection on the target face image; acquiring a first fusion image by fusing a virtual special effect and a face part matched in the target face image based on a face key point detection result; acquiring an occlusion mask of the target face image, wherein the occlusion mask is configured to indicate a face visible area which is not subject to an occluder and a face invisible area which is subject to the occluder in the target face image; and generating a second fusion image based on the occlusion mask and the first fusion image.

According to yet another aspect of embodiments of the present disclosure, a computer program product including at least one instruction is provided. The at least one instruction, when executed by a processor of an electronic device, causes the electronic device to perform a method including:

acquiring a target face image, and performing face key point detection on the target face image; acquiring a first fusion image by fusing a virtual special effect and a face part matched in the target face image based on a face key point detection result; acquiring an occlusion mask of the target face image, wherein the occlusion mask is configured to indicate a face visible area which is not subject to an occluder and a face invisible area which is subject to the occluder in the target face image; and generating a second fusion image based on the occlusion mask and the first fusion image.

It should be understood that the above general description and the following detailed description merely provide examples and are explanatory, and thereby do not limit the present disclosure.

BRIEF DESCRIPTION OF DRAWINGS

The drawings herein are incorporated in and constitute a part of the specification. They show the embodiments consistent with the present disclosure and are used in conjunction with the specification to explain the principles of the present disclosure, and thereby do not constitute improper limit to the present disclosure.

DESCRIPTION OF EMBODIMENTS

Figure 1:
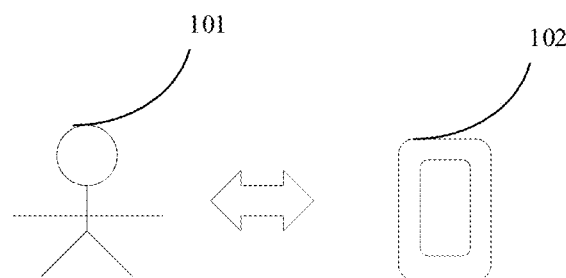
FIG. 1 is a schematic diagram of an implementation environment involved in method for processing images according to an embodiment.

In order to enable those skilled in the art better understand technical solutions of the present disclosure, technical solutions of embodiments of the present disclosure will be described clearly and completely below in combination with the accompanying drawings.

It is to be noted that terms "first," "second," and the like used in the specification, claims and the accompanying drawings are used for the purpose of distinguishing similar objects instead of indicating a particular order or sequence. It should be understood that the data used in this way can be interchanged under appropriate circumstances, such that the embodiments of the present disclosure described herein can be implemented in an order other than the order illustrated or described herein. The embodiments set forth in the following description of embodiments do not represent all embodiments consistent with the present disclosure. Instead, they are merely examples of apparatuses and methods consistent with aspects related to the present disclosure as recited in the appended claims.

The user information involved in the present disclosure may be information authorized by the user or fully authorized by all parties.

In the related technology, when adding a virtual special effect to a certain face part, the added virtual special effect may be directly displayed on the occluder if the face part is occluded by an occluder, which may undoubtedly affect the special effect adding result seriously.

Before explaining the embodiments of the present disclosure in detail, some terms involved in the embodiments of the present disclosure will be explained.

An occlusion mask is configured to distinguish a face visible area not occluded by the occluder (that is, not occluded) from a face invisible area occluded by the occluder (that is, having the occluder) in the face image. As an example, pixels taking a first value in the occlusion mask indicates the face visible area, and pixels taking a second value indicates the face invisible area. In addition, pixels taking a third value in the occlusion mask indicate non-face area except the face visible area and the face invisible area. The non-face area is also the background area. The third value may be the same as the first value, or may be the same as the second value, or may be different from the first value and the second value.

The occluder that occludes the face may be other body parts, such as a hand or arm, or may be an object, which is not specifically limited in the embodiment of the present disclosure.

In some embodiments, the occlusion mask may be a binary mask. For example, when pixels in the face image fall within a face visible area that is not occluded by the occluder, the corresponding location of the pixels in the occlusion mask is marked as 1; otherwise, it is marked as 0. That is, the value of the first value is 1, and the value of the second value is 0. In some embodiments, an area having a value of 0 in the occlusion mask indicates a face visible area of the face image, and an area having a value of 1 indicates a face invisible area of the face image.

Face detection refers to finding out locations of all faces in a given image.

Typically, the face is framed with a rectangular box. That is, what is input is an image, whereas what is output is a number of rectangular boxes containing the face and locations of the rectangular boxes.

Face key point detection is also known as face key localization or face alignment, and it refers to locating key areas of the face, including eyebrows, eyes, nose, mouth, facial contours, and the like, in a given face image.

The set of key points is usually called shape. The shape includes location information of the key points, and the location information may generally be expressed in two manners. The first manner is locations of the key points relative to the entire image, and the second manner is locations of the key points relative to the rectangular frame of the face, which is not specifically limited in the embodiment of the present disclosure.

For image semantic segmentation, semantics in the image field refers to the content of the image and the understanding of the meaning of the image, and segmentation refers to segmenting different objects in the image from the perspective of pixels. That is, the image semantic segmentation is a category decision of each pixel in the output image. To put it another way, the image semantic segmentation is to divide each pixel into one of several possible categories.

In the embodiments of the present disclosure, the face visible area not occluded by the occluder in the face image may be distinguished from the face invisible area occluded by the occluder based the image semantic segmentation.

For a virtual special effect, the virtual special effect in the embodiments of the present disclosure may generally refer to any special effect that can be configured to decorate the face. In some embodiments, the virtual special effect includes, but is not limited to, virtual makeup or virtual accessories. For example, the virtual makeup or virtual accessories selected by the user may be fused with face parts matched in the face image.

The virtual makeup herein includes, but is not limited to lipstick, eyebrows, eyelashes, blush, and other decorative types that may be used for face beauty. In some embodiments, each virtual special effect usually corresponds to a special effect template. For example, a lipstick special effect corresponds to a lipstick special effect template.

The implementation environment involved in a method for processing images according to the embodiments of the present disclosure is described hereinafter.

The method for processing images herein may be applicable to interactive scenarios, such as in the process of a video call, a video live broadcast, or the like, or may be applicable to non-interactive scenarios, such as in the process where a user takes an image or video, or may also be applicable to the process of performing image processing on the face image or video stored locally by the user, which is not specifically limited in the embodiment of the present disclosure.

Taking an application in the non-interactive scenarios as an example, referring to FIG. 1, the implementation environment includes a user 101 and an electronic device 102. The electronic device 102 generally refers to a mobile computer device, such as a tablet computer or a smart phone. The electronic device 102 is configured to collect a face image through a camera and perform the method for processing images. In addition, if under the interactive scenarios, the implementation environment shown in FIG. 1 further includes a server that performs data communication with the electronic device 102 and at least one other electronic device that performs data communication with the server.

Figure 2:
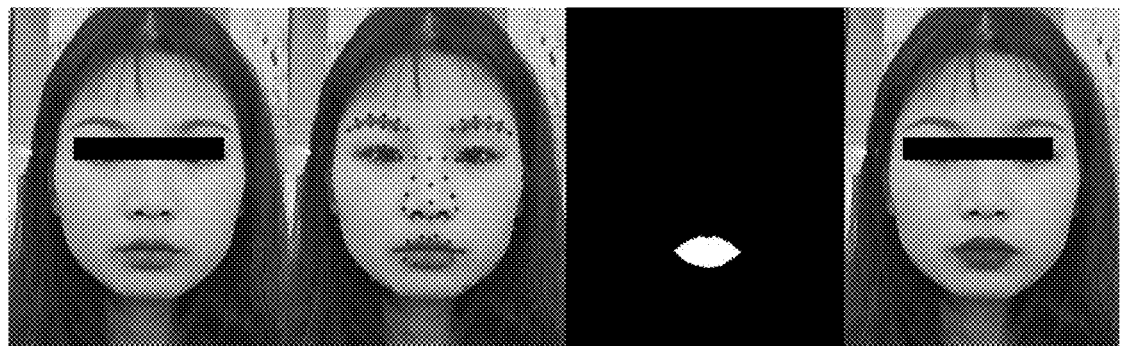
FIG. 2 is a schematic diagram of a result of adding a virtual special effect according to an embodiment.
Figure 3:
FIG. 3 is a schematic diagram of another result of adding a virtual special effect according to an embodiment.

Taking that the virtual special effect is added merely based on the face key point detection technology as an example, after the face key point detection is performed on a face image, a lip area may be fitted based on a face key point detection result as shown in FIG. 2. Since the user face in the face image is not occluded by the occluder, the virtual lipstick special effect can be completely fitted to the lip area. However, with respect to FIG. 3, after performing the face key point detection and fitting a lip area based on the face key point detection result, the virtual lipstick special effect is finally rendered on the user's finger since the user's face in the face image is occluded by the finger.

Based on the aforesaid description, the face key point detection technology is not sensitive to occlusion information, which generally only gives the location information of the key points and cannot distinguish whether the key point is occluded. Under this consideration, the embodiments of the present disclosure further incorporate the image semantic segmentation technology based on the face key point detection. That is, both the face key point technology and the image semantic segmentation technology are configured to add the virtual special effect to the face image.

For example, when adding the virtual special effect to the face image according to the embodiment of the present disclosure, the virtual special effect selected by the user may be firstly fused with the face part matched in the face image based on the face key point detection technology, and then, the fusion image as obtained is further processed based on an occlusion mask obtained by the semantic segmentation of the face image, such that only the virtual special effect added on the face visible area that is not occluded is retained.

Figure 4:
FIG. 4 is a schematic diagram of another result of adding a virtual special effect according to an embodiment.

It should be noted that, regardless of the application scenario, the method for processing images according to the embodiments of the present disclosure only requires the user to shoot images with the camera of the electronic device. FIG. 4 is a diagram showing a result of adding a virtual special effect according to an embodiment of the present disclosure. According to FIG. 4, no matter whether the user covers the lip area with the hand or not, the virtual beard effect only appears in the area where the user's lips are not covered and is hidden in the area where the user's lips are covered.

Figure 5:
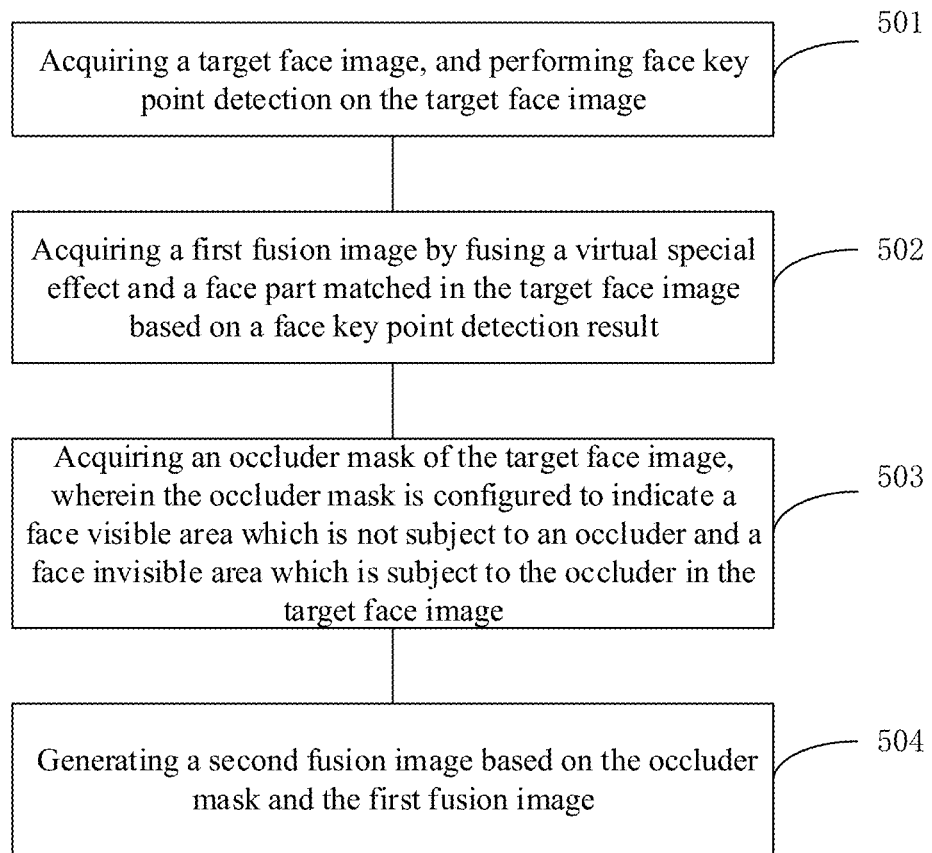
FIG. 5 is a flowchart of a method for processing images according to an embodiment.

FIG. 5 is a flowchart of a method for processing images according to an embodiment. As shown in FIG. 5, the method is applicable to an electronic device and includes following contents.

In 501, the electronic device acquires a target face image, and performs face key point detection on the target face image.

In 502, the electronic device obtains a first fusion image by fusing a selected virtual special effect and a face part matched in the target face image based on face key point detection result as obtained.

502 illustrates an example for the electronic device to obtain the first fusion image by fusing the virtual special effect and the face part matched in the target face image based on the face key point detection result as obtained. That is, a description of obtaining the first fusion image only for the virtual special effect currently selected by the user is given. In some embodiments, the first fusion image may be obtained in advance for a variety of hot virtual special effects, such that the user does not need to wait for the computer to process after selecting any kind of the virtual special effects and can directly call the first fusion image from the cache to thereby perform the subsequent image processing procedures.

In 503, the electronic device acquires an occlusion mask of the target face image. The occlusion mask distinguishes a face visible area not occluded by an occluder from a face invisible area occluded by the occluder in the target face image.

In other words, the occlusion mask is configured to indicate the face visible area which is not subject to the occluder and the face invisible area which is subject to the occluder in the target face image.

In 504, the electronic device generates a second fusion image based on the occlusion mask and the first fusion image.

The "second fusion image" in the embodiment of the present disclosure is an exemplary illustration of the "target fusion image".

In the method according to the embodiment of the present disclosure, after obtaining the target face image, an occlusion mask is further obtained in the embodiment of the present disclosure in addition to the first fusion image obtained by fusing the selected virtual special effect and a face part matched in the target face image based on the face key point detection result of the face key point detection performed on the target face image. In the target face image, the occlusion mask herein distinguishes the face visible area not occluded by the occluder from the face invisible area occluded by the occluder, such that a second fusion image is generated based on the occlusion mask and the first fusion image.

In some embodiments, acquiring the occlusion mask of the target face image includes: acquiring the face visible area and the face invisible area by semantically segmenting the target face image based on an image semantic segmentation model; and generating the occlusion mask of the target face image, wherein in the occlusion mask, pixels taking a first value indicate the face visible area, and pixels taking a second value indicate the face invisible area.

In some embodiments, the image semantic segmentation model is trained by: acquiring a training sample image and a label segmentation result of the training sample image, wherein the training sample image includes an image in which a face area is subject to the occluder; inputting the training sample image into a deep learning model; determining, based on a target loss function, whether a predicted segmentation result of the training sample image output by the deep learning model matches the label segmentation result or not; and acquiring the image semantic segmentation model by iteratively updating network parameters of the deep learning model until the deep learning model converges in the case that the predicted segmentation result does not match the label segmentation result.

In some embodiments, generating the second fusion image based on the occlusion mask and the first fusion image includes: determining the face visible area and the face invisible area in the first fusion image based on the occlusion mask; retaining the virtual special effect on the face visible area of the first fusion image as indicated by the occlusion mask, which also means to retain the virtual special effect on the face visible area of the first fusion image; and acquiring the second fusion image by drawing the occluder on the face invisible area of the first fusion image in a fashion of being placed on a top layer.

In some embodiments, acquiring the first fusion image by fusing the virtual special effect and the face part matched in the target face image based on the face key point detection result includes: determining the face part matching the virtual special effect; fitting a target location area in the target face image based on the face key point detection result and the determined face part; and acquiring the first fusion image by fusing the virtual special effect and the target location area of the target face image.

In some embodiments, acquiring the target face image includes: performing face detection on an acquired image; and acquiring the target face image by cropping a face area based on a face detection result in the case that the acquired image includes a face.

All the aforesaid optional technical solutions may be combined arbitrarily to form optional embodiments of the present disclosure, which is not described again in detail.

Figure 6:
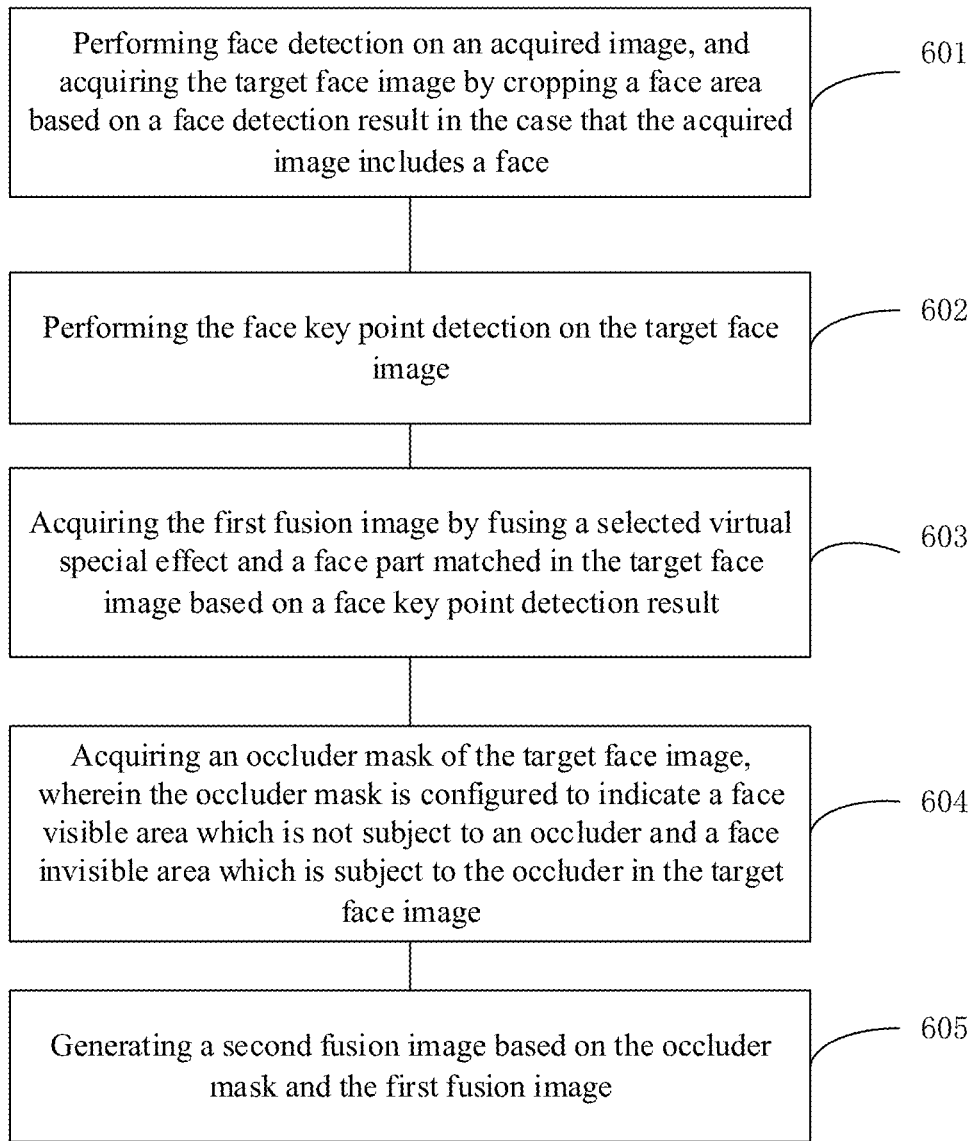
FIG. 6 is a flowchart of a method for processing images according to an embodiment.

FIG. 6 is a flowchart of a method for processing images according to an embodiment. The method for processing images according to the embodiment of the present disclosure is explained in detail hereinafter with reference to FIG. 7. Referring to FIG. 6, following contents are included. It should be noted that the "second fusion image" in the embodiment of the present disclosure is referred to as the "target fusion image"

In 601, the electronic device performs face detection on an acquired image, and acquires the target face image by cropping a face area based on a face detection result in the case that the acquired image includes a face.

The image acquired by the electronic device may be a video frame during a video call or live video broadcast, an image currently or pre-shot by the user, or a video frame in a pre-shot video, which is not specifically limited in the embodiments of the present disclosure. This embodiment only takes an image as an example to illustrate the entire image processing flow. It may be extended that the image processing flow may be applicable to a plurality of images or respective video frames of a video.

For the face detection, the face detected in the image is usually marked with a detection frame by giving the location information of the detection frame. That is, the location where the detected face appears in the image is given. In some embodiments, the face detection may be performed by either a deep learning face detection algorithm or a non-deep learning face detection algorithm, which is not specifically limited in the embodiment of the present disclosure.

The deep learning herein is derived from the research of artificial neural networks and belongs to a method of machine learning based on the representation of data. To put it another way, the deep learning is a new field in the research of machine learning, and has a motivation to build and simulate a neural network of the human brain for analysis and learning.

In the embodiment of the present disclosure, if a face is detected in the image, the electronic device may crop a face area image of the image. The face area image is also referred to herein as the target face image.

As an example, the cropping method may be implemented by performing external expansion according to a certain ratio based on the face detection result to thereby crop the face area and obtain the target face image. During the cropping, it should ensure that the face area as cropped is as complete as possible and cannot be too large.

In some embodiments, a face center may be determined based on the face detection result, and the face center may be a geometric center point of the face detection frame. Then, the external expansion may be performed in a certain proportion by taking the face center as a criterion to crop the face area, which is not specifically limited in the embodiment of the present disclosure.

Figure 7:
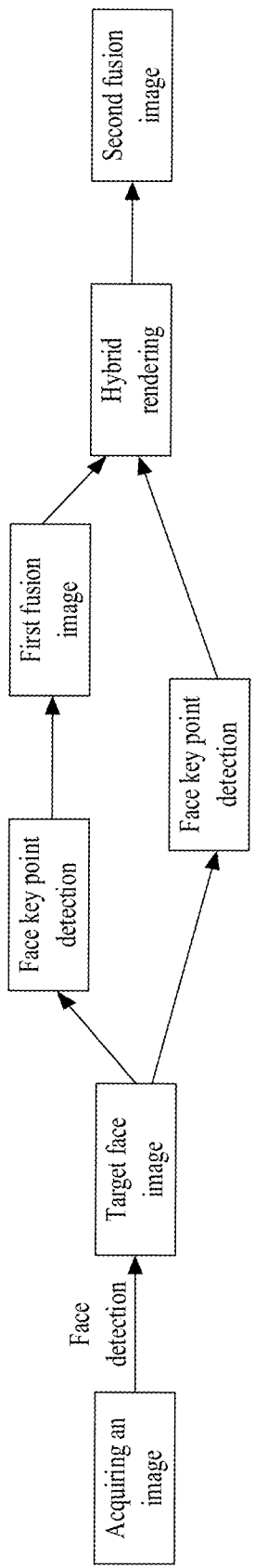
FIG. 7 is a flowchart of a method for processing images according to an embodiment.

It should be noted that, as shown in FIG. 7, after the target face image is acquired, 602 and 603, and 604 may be performed through two branches, respectively. 602 and 603 may be performed before 604; or 604 may be performed before 602 and 603. The embodiment of the present disclosure does not specifically limit the execution sequence between the two branches.

In 602, the electronic device performs the face key point detection on the target face image.

For the face key point detection, the face key points include, but are not limited to, eyebrows, eyes, nose, mouth, face contour, or the like. In some embodiments, the model training may be performed based on a plurality of face images and face key point coordinates detected in the plurality of face images to obtain a network model having face key point detection capabilities. In the subsequent process, while detecting a face key point in a certain image, the image may be input into the network model to perform the face key point detection on the image based on the network model, thereby determining the face key point coordinates in the image.

In 603, the electronic device acquires a first fusion image by fusing a selected virtual special effect and a face part matched in the target face image based on a face key point detection result.

603 illustrates an example for the electronic device to obtain the first fusion image by fusing the virtual special effect and the face part matched in the target face image based on the face key point detection result. That is, a description of obtaining the first fusion image only for the virtual special effect currently selected by the user is given. In some embodiments, the first fusion image may be obtained in advance for a variety of hot virtual special effects, such that the user does not need to wait for the computer to process after selecting any kind of the virtual special effects and can directly call the first fusion image from the cache to thereby perform the subsequent image processing procedures.

As shown in FIG. 7, this step mainly aims to fit a corresponding location area requiring the virtual special effect processing based on the face key point detection result and the face part (such as, eyes, mouth and the like) the user wants to beautify, such that the location area may be processed by the virtual special effect to complete beautification of the face image in the first step.

Generally, each virtual special effect matches a face part, such that when the user selects a corresponding virtual special effect, the face part that matches the virtual special effect is determined accordingly. For example, the eyebrow special effect matches the eyebrows, which indicates that the eyebrow special effect shall be added to the location of the eyebrows of the face; and the lipstick special effect matches the lips, which indicates that the lipstick special effect shall be added to the location of the lips of the face.

In some embodiments, acquiring the first fusion image by fusing the selected virtual special effect and the face part matched in the target face image based on the face key point detection result includes, but is not limited to: determining the face part matching the selected virtual special effect; fitting a target location area in the target face image based on the face key point detection result and the determined face part; and acquiring the first fusion image by fusing the selected virtual special effect and the target location area of the target face image.

As an example, the virtual special effect nowadays generally forms as a special effect template. Thus, fusing the selected virtual special effect and the face part matched in the target face image also means fusing the special effect template of the virtual special effect selected by the user and the target face image. It should be noted that the special effect template may be fused into the target location area of the target face image based on the face key point detection technology. The fusion algorithm mainly includes, but is not limited to, alpha fusion, Photoshop layer blending, Poisson fusion, and the like, which is not specifically limited in the embodiments of the present disclosure.

In addition, considering the inconsistency of the facial features of different face images, before fusing the special effect template with the face image, it may also involve deforming the special effect template to fit the facial features of the face. The deformation algorithm includes, but is not limited to, affine transformation, inverse distance weighted (IDW) transformation, moving least squares (MLS) transformation, and the like, which is not specifically limited in the embodiment of the present disclosure.

Figure 8:
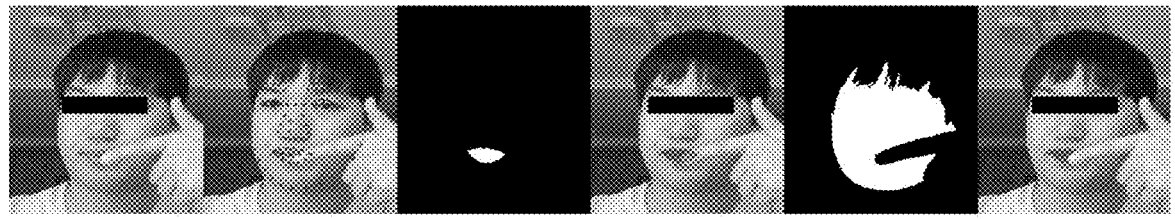
FIG. 8 is a schematic diagram of another result of adding a virtual special effect according to an embodiment.

In some embodiments, by taking that the face part the user wants to apply makeup is lips and the virtual special effect is lipstick as an example, an occluder (specifically, the user's finger), as shown in FIG. 8, appears in the face image and partially covers the lips. Thus, the lipstick special effect may be directly added to the lip area after fitting the lip area requiring the makeup based on the face key point detection result obtained by performing the face key detection on the face image. However, since the user's finger partially covers the lips, the lipstick special effect shown in FIG. 8 may be added to the user's finger at this point.

Figure 9:
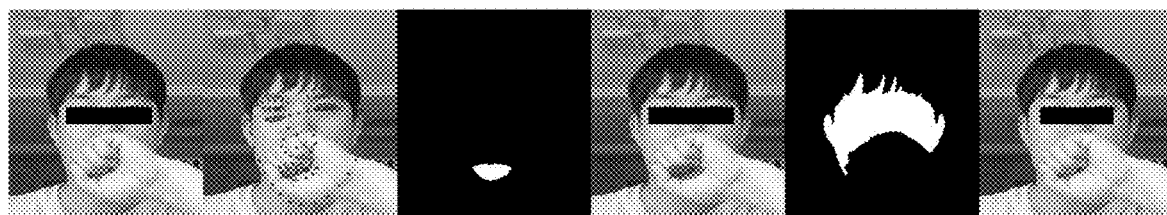
FIG. 9 is a schematic diagram of another result of adding a virtual special effect according to an embodiment.

In some embodiments, by further taking that the face part the user wants to apply makeup is lips and the virtual special effect is lipstick as an example, an occluder (such as, the user's hand), as shown in FIG. 9, appears in the face image and completely covers the lips. Thus, the lipstick special effect may be directly added to the lip area after fitting the lip area requiring the makeup based on the face key point detection result obtained by performing the face key detection on the face image. However, since the user's hand completely covers the lips, the lipstick special effect shown in FIG. 8 may be completely added to the user's hand rather than the lips.

Figure 10:
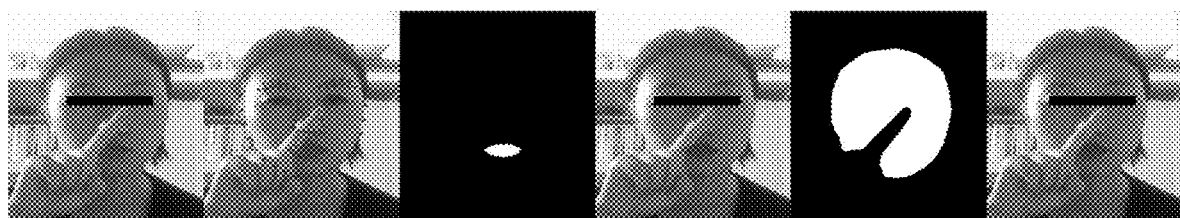
FIG. 10 is a schematic diagram of another result of adding a virtual special effect according to an embodiment.

In some embodiments, by further taking that the face part the user wants to apply makeup is lips and the virtual special effect is lipstick as an example, an occluder (specifically, the user's finger), as shown in FIG. 10, appears in the face image and partially covers the lips. Thus, the lipstick special effect may be directly added to the lip area after fitting the lip area requiring the makeup based on the face key point detection result obtained by performing the face key detection on the face image. However, since the user's finger partially covers the lips, the lipstick special effect shown in FIG. 10 may be added to the user's finger at this point.

Figure 11:
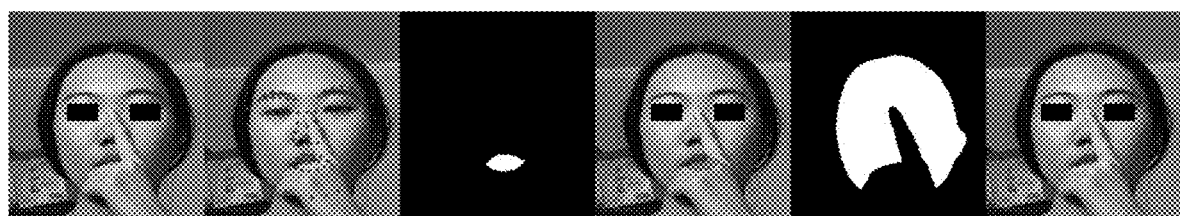
FIG. 11 is a schematic diagram of another result of adding a virtual special effect according to an embodiment.

In some embodiments, by further taking that the face part the user wants to apply makeup is lips and the virtual special effect is lipstick as an example, an occluder (specifically, the user's hand), as shown in FIG. 11, appears in the face image and partially covers the lips. Thus, the lipstick special effect may be directly added to the lip area after fitting the lip area requiring the makeup based on the face key point detection result obtained by performing the face key detection on the face image. However, since the user's hand partially covers the lips, the lipstick special effect shown in FIG. 11 may be added to the user's hand at this time.

In 604, the electronic device acquires an occlusion mask of the target face image. The occlusion mask distinguishes a face visible area not occluded by an occluder from a face invisible area occluded by an occluder in the target face image.

In other words, the occlusion mask is configured to indicate the face visible area which is not subject to the occluder and the face invisible area which is subject to the occluder in the target face image.

This step means to semantically segmenting the target image to generate the occlusion mask of the target image, the occlusion mask reflecting the occlusion information of the target face image.

After semantically segmenting the target image, the segmentation result as given may distinguish the face visible area not occluded by the occluder from the face invisible area occluded by the occluder. The face invisible area that is occluded is namely covered by the occluder.

In some embodiments, pixels taking a first value in the occlusion mask indicate the face visible area, and pixels taking a second value indicate the face invisible area.

In some embodiments, the occlusion mask may be a binary mask. For example, when pixels in the target face image fall within the face visible area that is not occluded, the corresponding location in the occlusion mask is set as 1; otherwise, when pixels in the target face image fall within the face invisible area that is occluded, the corresponding location in the occlusion mask is set as 0. That is, the value of the first value may be 1, and the value of the second value may be 0. To put it another way, an area having a value of 0 in the occlusion mask indicates a face visible area of the face image, and an area having a value of 1 indicates a face invisible area of the face image.

In the embodiment of the present disclosure, the target face image may be semantically segmented based on the image semantic segmentation model trained in advance to thereby obtain the aforesaid face visible area and face invisible area. The image semantic segmentation model is usually more sensitive to edges.

In some embodiments, a training process of the image semantic segmentation model includes, but is not limited to, following contents.

a), The electronic device acquires the training sample image and the label segmentation result of the training sample image.

The training sample image includes images in which a large number of face areas are occluded by the occluder, such as hands or objects, and the label segmentation result of the training sample image are manually labeled. In some embodiments, the face visible area that is not occluded and the face invisible area that is occluded in each training sample image are manually given in the label segmentation result.

b), The electronic device inputs the training sample image into the deep learning model, and determines, based on a target loss function, whether a predicted segmentation result of the training sample image output by the deep learning model matches the label segmentation result or not.

As an example, the aforesaid target loss function may be a cross-entropy loss function, and the deep learning model may be a convolutional neural network, such as a fully convolutional neural network, which is not specifically limited in the embodiment of the present disclosure.

c), When the predicted segmentation result does not match the label segmentation result, the electronic device acquires the image semantic segmentation model by iteratively updating the network parameters of the deep learning model repeatedly until the model converges.

In 605, the electronic device generates a second fusion image based on the occlusion mask and the first fusion image.

This step corresponds to the last step in FIG. 7. That is, the first fusion image and the occlusion mask as obtained based on the face key point detection technology are hybrid-rendered to complete the face beautification based on the face key point detection result and the face semantic segmentation result. During hybrid rendering, only the virtual special effect on the face visible area of the first fusion image as indicated by the occlusion mask is retained. That is, generating the second fusion image based on the occlusion mask and the first fusion image includes, but is not limited to: retaining the virtual special effect in the face visible area of the first fusion image as indicated by the occlusion mask; and drawing the occluder on the face invisible area of the first fusion image as indicated by the occlusion mask by placing in a top layer to obtain the second fusion image. The drawing by placing in the top layer is to draw the occluder covering the face on the top layer of the first fusion image, and the drawing range is limited to the aforesaid face invisible area.

The aforesaid process also means that the electronic device may determine the face visible area and the face invisible area in the first fusion image based on the occlusion mask, retain the virtual special effect in the face visible area of the first fusion image, and draw the occluder on the face invisible area of the first fusion image by placing in the top layer to obtain the second fusion image.

As further shown in FIG. 8 to FIG. 11, respective images in each of FIG. 8 to FIG. 11 from left to right may be the original face image, the face key point detection result, the lip area fitted based on the key point detection result of the face, and the second fusion image obtained by hybrid-rendering the occlusion mask and the first fusion image based on the first fusion image obtained by the face key point detection technology and the image semantic segmentation result (the white part corresponds to the face visible area).

According to the aforesaid results, the finally obtained fusion image has no virtual special effect displayed on the occluder.

In another embodiment, in addition to the image method involved in the embodiment of the present disclosure, the virtual special effect may also be performed on the face only based on the face key point detection technology. The difference lies in that a step of determining whether each key point is occluded or not is added in the process of training the network model for the face key point detection, such that not only the location information of the face key points can be obtained based on the face key point detection technology, but also the information about whether each key point of the face is occluded or not can be obtained. However, the solution still has the following two problems: 1. the face key points are insensitive to the occlusion, and thereby the feedback occlusion information is inaccurate; 2. even if the occlusion information is accurate, the defect that some virtual special effects are displayed on the occluder may still occur since the face key points are discrete.

Figure 12:
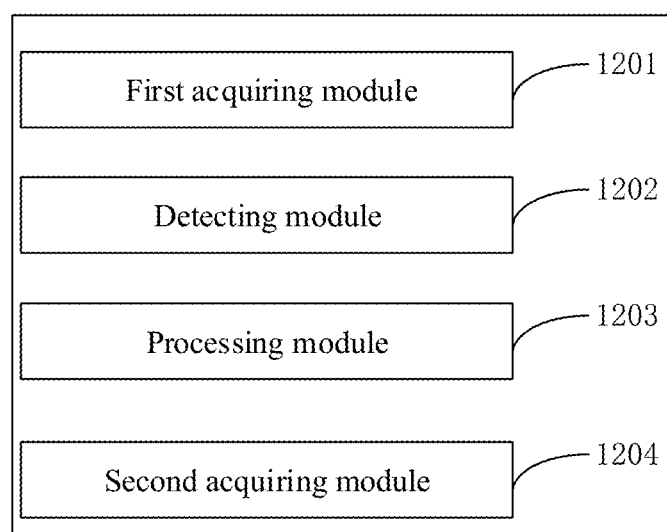
FIG. 12 is a block diagram of an apparatus for processing images according to an embodiment.

FIG. 12 is a block diagram of an apparatus for processing images according to an embodiment. Referring to FIG. 12, the apparatus includes a first acquiring module 1201, a detecting module 1202, a processing module 1203, and a second acquiring module 1204. It should be noted that the "second fusion image" in the embodiment of the present disclosure is referred to as the "target fusion image".

The first acquiring module 1201 is configured to acquire a target face image.

The detecting module 1202 is configured to perform face key point detection on the target face image.

The processing module 1203 is configured to acquire a first fusion image by fusing a virtual special effect and a face part matched in the target face image based on a face key point detection result.

The second acquiring module 1204 is configured to acquire an occlusion mask of the target face image, wherein the occlusion mask is configured to indicate a face visible area which is not subject to an occluder and a face invisible area which is subject to the occluder in the target face image.

The processing module 1203 is configured to generate a second fusion image based on the occlusion mask and the first fusion image.

In some embodiments, the second acquiring module is further configured to acquire the face visible area and the face invisible area by semantically segmenting the target face image based on an image semantic segmentation model; and generate the occlusion mask of the target face image, wherein in the occlusion mask, pixels taking a first value are configured to indicate the face visible area, and pixels taking a second value are configured to indicate the face invisible area.

In some embodiments, the apparatus further includes a training module. The training module is configured to: acquire a training sample image and a label segmentation result of the training sample image, wherein the training sample image includes an image in which a face area is subject to the occluder; input the training sample image into a deep learning model; determining, based on a target loss function, whether a predicted segmentation result of the training sample image output by the deep learning model matches the label segmentation result or not; and acquire the image semantic segmentation model by iteratively updating network parameters of the deep learning model until the deep learning model converges in the case that the predicted segmentation result does not match the label segmentation result.

In some embodiments, the processing module is further configured to retain the virtual special effect in the face visible area of the first fusion image as indicated by the occlusion mask, and acquire the second fusion image by drawing the occluder on the face invisible area of the first fusion image in a fashion of being placed on a top layer.

In other words, the processing module is further configured to: determine the face visible area and the face invisible area in the first fusion image based on the occlusion mask; retain the virtual special effect in the face visible area of the first fusion image; and acquire the second fusion image by drawing the occluder on the face invisible area of the first fusion image in the fashion of being placed on the top layer.

In some embodiments, the processing module is further configured to: determine the face part matching a selected virtual special effect; fit a target location area in the target face image based on the face key point detection result and the determined face part; and acquire the first fusion image by fusing the virtual special effect and the target location area of the target face image.

In some embodiments, the first acquiring module is configured to perform face detection on an acquired image, and acquiring the target face image by cropping a face area based on a face detection result in the case that the acquired image includes a face.

All the aforesaid optional technical solutions may be combined arbitrarily to form optional embodiments of the present disclosure, which are not described again in detail.

With regard to the device in the forgoing described embodiments, the specific manner in which the respective modules perform the operations has been described in detail in the embodiments of the method, which are not explained in detail herein.

Figure 13:
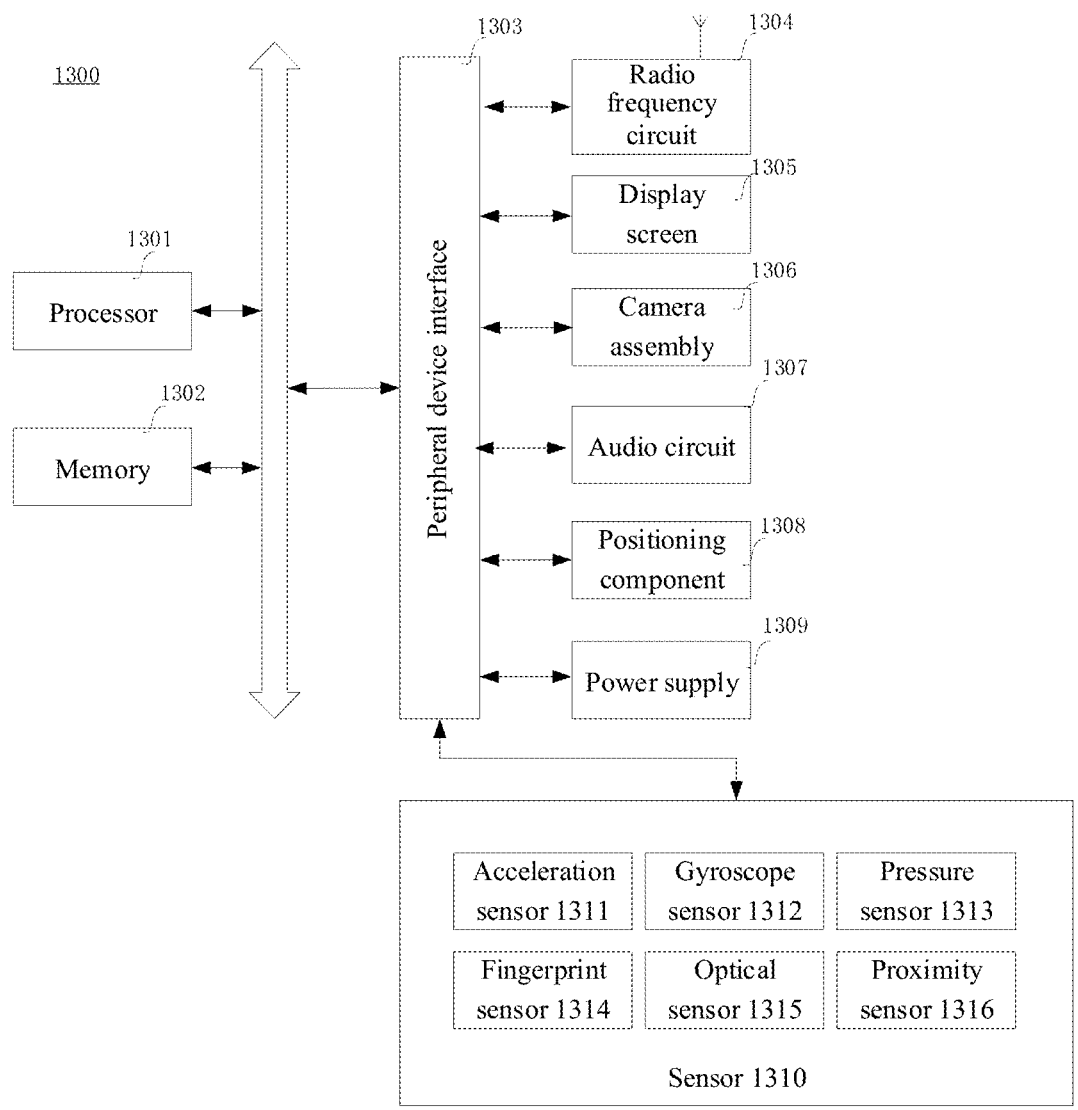
FIG. 13 is a block diagram of an electronic device according to an embodiment.

FIG. 13 is a structural block diagram of an electronic device according to an embodiment.

Generally, the device 1300 includes a processor 1301 and a memory 1302.

The processor 1301 may include one or more processing cores, such as a 4-core processor and an 8-core processor. The processor 1301 may be implemented in at least one hardware form selected from a digital signal processor (DSP), a field-programmable gate array (FPGA), and a programmable logic array (PLA). The processor 1301 may further include a main processor and a co-processor. The main processor is a processor for processing data in an awake state, and is also called a central processing unit (CPU). The co-processor is a low-power processor for processing data in a standby state. In some embodiments, the processor 1301 may be integrated with a graphics processing unit (GPU), and the GPU is configured to render and draw the content to be displayed on the display screen. In some embodiments, the processor 1301 may further include an artificial intelligence (AI) processor, and the AI processor is configured to process calculation operations related to the machine learning.

The memory 1302 may include one or more computer-readable storage media, which may be non-transitory. The memory 1302 may further include a high-speed random access memory and a non-volatile memory, such as one or more magnetic disk storage devices and flash memory storage devices. In some embodiments, the non-transitory computer-readable storage medium in the memory 1302 is configured to store at least one instruction. The at least one instruction is configured to be executed by the processor 1301 to perform the method for processing images performed by the electronic device provided in the method embodiments of the present disclosure.

In some embodiments, the device 1300 may further include: a peripheral device interface 1303 and at least one peripheral device. The processor 1301, the memory 1302, and the peripheral device interface 1303 may be connected by a bus or a signal line. Respective peripheral devices may be connected to the peripheral device interface 1303 through a bus, a signal line, or a circuit board. Specifically, the peripheral device includes: at least one of a radio frequency circuit 1304, a touch display screen 1305, a camera 1306, an audio circuit 1307, a positioning component 1308, and a power supply 1309.

The peripheral device interface 1303 may be configured to connect at least one peripheral device related to input/output (I/O) to the processor 1301 and the memory 1302. In some embodiments, the processor 1301, the memory 1302, and the peripheral device interface 1303 are integrated on the same chip or circuit board. In some other embodiments, any one or two of the processor 1301, the memory 1302, and the peripheral device interface 1303 may be implemented on a separate chip or circuit board, which is not limited in this embodiment.

The radio frequency circuit 1304 is configured to receive and transmit radio frequency (RF) signals (also called electromagnetic signals). The radio frequency circuit 1304 communicates with a communication network and other communication devices through electromagnetic signals. The radio frequency circuit 1304 converts electrical signals into electromagnetic signals for transmission, or converts the electromagnetic signals as received into electrical signals. In some embodiments, the radio frequency circuit 1304 includes: an antenna system, an RF transceiver, one or more amplifiers, a tuner, an oscillator, a digital signal processor, a codec chipset, a user identity module card, and so on. The radio frequency circuit 1304 may communicate with other terminals through at least one wireless communication protocol. The wireless communication protocol includes, but is not limited to: World Wide Web, Metropolitan Area Network, Intranet, various generations of mobile communication networks (2G, 3G, 4G, and 5G), wireless local area network and/or wireless fidelity (Wi-Fi) network. In some embodiments, the radio frequency circuit 1304 may also include a circuit related to near-field communication (NFC), which is not limited in the present disclosure.

The display screen 1305 is configured to display a user interface (UI). The UI may include graphics, text, icons, videos, and any combination thereof. When the display screen 1305 is a touch display screen, the display screen 1305 may further have a capacity to collect touch signals on or above a surface of the display screen 1305. The touch signal may be input to the processor 1301 as a control signal for processing. At this point, the display screen 1305 may further be configured to provide virtual buttons and/or virtual keyboards (also called soft buttons and/or soft keyboards). In some embodiments, there may be one display screen 1305, which is provided on a front panel of the device 1300. In other embodiments, there may be at least two display screens 1305, which are respectively provided on different surfaces of the device 1300 or designed in a folding manner. In still other embodiments, the display screen 1305 may be a flexible display screen, which is provided on a curved surface or a folding surface of the device 1300. Furthermore, the display screen 1305 may even be formed as a non-rectangular irregular pattern, and is namely a special-shaped screen. The display screen 1305 may be made of materials such as a liquid crystal display (LCD), and an organic light-emitting diode (OLED).

The camera assembly 1306 is configured to collect images or videos. In some embodiments, the camera assembly 1306 includes a front camera and a rear camera. Generally, the front camera is provided on the front panel of the terminal, and the rear camera is provided on the rear surface of the terminal. In some embodiments, there are at least two rear cameras, which may be one of a main camera, a depth-of-field camera, a wide-angle camera, and a telephoto camera, respectively, to realize the background blur function by fusing the main camera and the depth-of-field camera, and realize the panoramic shooting and the virtual reality (VR) shooting function or other fusion shooting functions by fusing the main camera and the wide-angle camera. In some embodiments, the camera assembly 1306 may further include a flash. The flash may be a single color temperature flash or a dual color temperature flash. The dual color temperature flash refers to a combination of warm light flash and cold light flash, which may be used for light compensation under different color temperatures.

The audio circuit 1307 may include a microphone and a speaker. The microphone is configured to collect sound waves of the user and the environment, convert the sound waves into an electrical signal, and input the electrical signal to the processor 1301 for processing or input to the radio frequency circuit 1304 to realize voice communication. For the purpose of stereo collection or noise reduction, there may be a plurality of microphones, which are respectively provided in different portions of the device 1300. The microphone may also be an array microphone or an omnidirectional acquisition microphone. The speaker is configured to convert the electrical signal from the processor 1301 or the radio frequency circuit 1304 into sound waves. The speaker may be a traditional membrane speaker or a piezoelectric ceramic speaker. When the speaker is a piezoelectric ceramic speaker, it can not only convert the electrical signal into human audible sound waves, but also convert the electrical signal into human inaudible sound waves for distance measurement or other purposes. In some embodiments, the audio circuit 1307 may further include a headphone jack.

The positioning component 1308 is configured to locate a current geographic location of the device 1300 to implement navigation or a location based service (LBS). In some embodiments, the positioning component 1308 may be the United States' Global Positioning System (GPS), Russia's Global Navigation Satellite System (GLONASS), China's BeiDou Navigation Satellite System (BDS), and the European Union's Galileo.

The power supply 1309 is configured to supply power to various components in the device 1300. The power supply 1309 may be alternating current, direct current, disposable batteries or rechargeable batteries. When the power supply 1309 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may further be configured to support fast charging technology.

In some embodiments, the device 1300 further includes one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of the coordinate system established by the device 1300. For example, the acceleration sensor 1311 may be configured to detect components of the gravitational acceleration in the three coordinate axes. The processor 1301 may control the touch display screen 1305 to display the user interface in a horizontal view or a vertical view based on the gravitational acceleration signal collected by the acceleration sensor 1311. The acceleration sensor 1311 may also be configured to collect motion data of a game or the user.

The gyroscope sensor 1312 may detect a body direction and rotation angle of the device 1300, and the gyroscope sensor 1312 may cooperate with the acceleration sensor 1311 to collect 3D actions of the user on the device 1300. Based on the data collected by the gyroscope sensor 1312, the processor 1301 can implement the following functions: motion sensing (such as changing the UI based on the user's tilt operation), image stabilization during shooting, game control, and inertial navigation.

The pressure sensor 1313 may be provided on a side frame of the device 1300 and/or a lower layer of the touch display screen 1305. When the pressure sensor 1313 is provided on the side frame of the device 1300, a holding signal of the user to the device 1300 may be detected, such that the processor 1301 performs left and right hand recognition or quick operation based on the holding signal collected by the pressure sensor 1313. When the pressure sensor 1313 is provided at the lower layer of the touch display screen 1305, the processor 1301 controls the operability control on the UI interface based on the pressure operations of the user on the touch display screen 1305. The operability control includes at least one of a button control, a scroll bar control, an icon control, and a menu control.

The fingerprint sensor 1314 is configured to collect the user's fingerprint. The processor 1301 identifies the user's identity based on the fingerprint collected by the fingerprint sensor 1314, or the fingerprint sensor 1314 identifies the user's identity based on the collected fingerprint. When it is recognized that the user's identity is a trusted identity, the processor 1301 authorizes the user to perform related sensitive operations, including unlocking the screen, viewing encrypted information, downloading software, paying, and changing settings. The fingerprint sensor 1314 may be provided on a front surface, a back surface or a side surface of the device 1300. When a physical button or a manufacturer logo is provided on the device 1300, the fingerprint sensor 1314 may be integrated with the physical button or the manufacturer logo.

The optical sensor 1315 is configured to collect light intensity of the environment. In an embodiment, the processor 1301 may control the display brightness of the touch display screen 1305 based on the light intensity of the environment collected by the optical sensor 1315. Specifically, when the light intensity of the environment is high, the display brightness of the touch display screen 1305 is increased; and when the light intensity of the environment is low, the display brightness of the touch display screen 1305 is decreased. In another embodiment, the processor 1301 may further dynamically adjust the shooting parameters of the camera assembly 1306 based on the light intensity of the environment collected by the optical sensor 1315.

The proximity sensor 1316, also called a distance sensor, is usually provided on a front panel of the device 1300. The proximity sensor 1316 is configured to collect a distance between the user and the front surface of the device 1300. In an embodiment, when the proximity sensor 1316 detects that the distance between the user and the front surface of the device 1300 gradually decreases, the processor 1301 may control the touch display screen 1305 to switch from an on-screen state to an off-screen state. When the proximity sensor 1316 detects that the distance between the user and the front surface of the device 1300 gradually increases, the processor 1301 may control the touch display screen 1305 to switch from the off-screen state to the on-screen state.

Those skilled in the art may understand that the structure shown in FIG. 13 does not constitute a limitation on the device 1300, and may include more or fewer components than those shown in FIG. 13, or may combine some components, or adopt a different component arrangement.

In some embodiments, the electronic device includes: a processor, and a memory configured to store at least one computer program including at least one instruction executable by the processor. The at least one computer program, when loaded and run by the processor, causes the processor to execute instructions for: acquiring a target face image, and performing face key point detection on the target face image; acquiring a first fusion image by fusing a virtual special effect and a face part matched in the target face image based on a face key point detection result;

acquiring an occlusion mask of the target face image, wherein the occlusion mask is configured to indicate a face visible area which is not subject to an occluder and a face invisible area which is subject to the occluder in the target face image; and generating a second fusion image based on the occlusion mask and the first fusion image.

In some embodiments, the at least one computer program, when loaded and run by the processor, causes the processor to execute instructions for: acquiring the face visible area and the face invisible area by semantically segmenting the target face image based on an image semantic segmentation model; and generating the occlusion mask of the target face image, wherein in the occlusion mask, pixels taking a first value are configured to indicate the face visible area, and pixels taking a second value are configured to indicate the face invisible area.

In some embodiments, the at least one computer program, when loaded and run by the processor, causes the processor to execute instructions for: acquiring a training sample image and a label segmentation result of the training sample image, wherein the training sample image includes an image in which a face area is subject to the occluder; inputting the training sample image into a deep learning model; determining, based on a target loss function, whether a predicted segmentation result of the training sample image output by the deep learning model matches the label segmentation result or not; and acquiring the image semantic segmentation model by iteratively updating network parameters of the deep learning model until the deep learning model converges in the case that the predicted segmentation result does not match the label segmentation result.

In some embodiments, the at least one computer program, when loaded and run by the processor, causes the processor to execute instructions for: determining the face visible area and the face invisible area in the first fusion image based on the occlusion mask; retaining the virtual special effect in the face visible area of the first fusion image; and acquiring the second fusion image by drawing the occluder on the face invisible area of the first fusion image in a fashion of being placed on a top layer.

In some embodiments, the at least one computer program, when loaded and run by the processor, causes the processor to execute instructions for: determining the face part matching the virtual special effect; fitting a target location area in the target face image based on the face key point detection result and the determined face part; and acquiring the first fusion image by fusing the virtual special effect and the target location area of the target face image.

In some embodiments, the at least one computer program, when loaded and run by the processor, causes the processor to execute instructions for: performing face detection on an acquired image; and acquiring the target face image by cropping a face area based on a face detection result in the case that the acquired image includes a face.

An embodiment provides a non-transitory computer-readable storage medium storing at least one computer program including at least one instruction. The at least one computer program, when loaded and run by a processor of an electronic device, causes the electronic device to execute instructions for: acquiring a target face image, and performing face key point detection on the target face image; acquiring a first fusion image by fusing a virtual special effect and a face part matched in the target face image based on a face key point detection result; acquiring an occlusion mask of the target face image, wherein the occlusion mask is configured to indicate a face visible area which is not subject to an occluder and a face invisible area which is subject to the occluder in the target face image; and generating a second fusion image based on the occlusion mask and the first fusion image.

In some embodiments, the at least one computer program, when loaded and run by the processor of the electronic device, causes the electronic device to execute instructions for: acquiring the face visible area and the face invisible area by semantically segmenting the target face image based on an image semantic segmentation model; and generating the occlusion mask of the target face image, wherein in the occlusion mask, pixels taking a first value are configured to indicate the face visible area, and pixels taking a second value are configured to indicate the face invisible area.

In some embodiments, the at least one computer program, when loaded and run by the processor of the electronic device, causes the electronic device to execute instructions for: acquiring a training sample image and a label segmentation result of the training sample image, wherein the training sample image includes an image in which a face area is subject to the occluder; inputting the training sample image into a deep learning model; determining, based on a target loss function, whether a predicted segmentation result of the training sample image output by the deep learning model matches the label segmentation result or not; and acquiring the image semantic segmentation model by iteratively updating network parameters of the deep learning model until the deep learning model converges in the case that the predicted segmentation result does not match the label segmentation result.

In some embodiments, the at least one computer program, when loaded and run by the processor of the electronic device, causes the electronic device to execute instructions for: determining the face visible area and the face invisible area in the first fusion image based on the occlusion mask; retaining the virtual special effect in the face visible area of the first fusion image; and acquiring the second fusion image by drawing the occluder on the face invisible area of the first fusion image in a fashion of being placed on a top layer.

In some embodiments, the at least one computer program, when loaded and run by the processor of the electronic device, causes the electronic device to execute instructions for: determining the face part matching the virtual special effect; fitting a target location area in the target face image based on the face key point detection result and the determined face part; and acquiring the first fusion image by fusing the virtual special effect and the target location area of the target face image.

In some embodiments, the at least one computer program, when loaded and run by the processor of the electronic device, causes the electronic device to execute instructions for: performing face detection on an acquired image; and acquiring the target face image by cropping a face area based on a face detection result in the case that the acquired image includes a face.

An embodiment provides a computer program product including at least one instruction. The computer program product, when loaded and run by a processor of an electronic device, causes the electronic device to perform the method for processing images according to any one of the aforesaid embodiments.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as examples only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for processing images, comprising:
acquiring a target face image, and performing face key point detection on the target face image to acquire a face key point detection result;
determining a face visible area which is not subject to an occluder and a face invisible area which is subject to the occluder in the target face image; and
acquiring a target fusion image by fusing a virtual special effect and a face part matched in the target face image based on the face key point detection result, the face visible area and the face invisible area; and
wherein said acquiring the target fusion image by fusing the virtual special effect and the face part matched in the target face image based on the face key point detection result, the face visible area and the face invisible area comprises:
acquiring a first fusion image by fusing the virtual special effect and the face part matched in the target face image based on the face key point detection result; and
generating the target fusion image base on the face visible area, the face invisible area and the first fusion image; and
wherein said generating the target fusion image base on the face visible area, the face invisible area and the first fusion image comprises:
retaining the virtual special effect in the face visible area of the first fusion image; and
acquiring the target fusion image by drawing the occluder on the face invisible area of the first fusion image in a fashion of being placed on a top layer.

2. The method according to claim 1, wherein said determining the face visible area which is not subject to the occluder and the face invisible area which is subject to the occluder in the target face image comprises:
acquiring an occlusion mask of the target face image, wherein the occlusion mask is configured to indicate the face visible area which is not subject to the occluder and the face invisible area which is subject to the occluder in the target face image;
and said generating the target fusion image base on the face visible area, the face invisible area and the first fusion image comprises:
generating the target fusion image based on the occlusion mask and the first fusion image.

3. The method according to claim 2, wherein said acquiring the occlusion mask of the target face image comprises:
acquiring the face visible area and the face invisible area by semantically segmenting the target face image based on an image semantic segmentation model; and
generating the occlusion mask of the target face image, wherein in the occlusion mask, pixels taking a first value are configured to indicate the face visible area, and pixels taking a second value are configured to indicate the face invisible area.

4. The method according to claim 3, wherein the image semantic segmentation model is trained by:
acquiring a training sample image and a label segmentation result of the training sample image, wherein the training sample image comprises an image in which a face area is subject to the occluder;
inputting the training sample image into a deep learning model;
determining, based on a target loss function, whether a predicted segmentation result of the training sample image output by the deep learning model matches the label segmentation result or not; and
acquiring the image semantic segmentation model by iteratively updating network parameters of the deep learning model until the deep learning model converges in response to the predicted segmentation result not matching the label segmentation result.

5. The method according to claim 2, wherein said generating the target fusion image based on the occlusion mask and the first fusion image comprises:
determining the face visible area and the face invisible area in the first fusion image based on the occlusion mask;
retaining the virtual special effect in the face visible area of the first fusion image; and
acquiring the target fusion image by drawing the occluder on the face invisible area of the first fusion image in a fashion of being placed on a top layer.

6. The method according to claim 1, wherein said acquiring the first fusion image by fusing the virtual special effect and the face part matched in the target face image based on the face key point detection result comprises:
determining the face part matching the virtual special effect;
fitting a target location area in the target face image based on the face key point detection result and the determined face part; and
acquiring the first fusion image by fusing the virtual special effect and the target location area of the target face image.

7. The method according to claim 1, wherein said acquiring the target face image comprises:
performing face detection on an acquired image; and
acquiring the target face image by cropping a face area based on a face detection result in response to the acquired image comprising a face.

8. An electronic device, comprising:
a processor; and
a memory configured to store at least one computer program including at least one instruction executable by the processor;
wherein the at least one instruction, when executed by the processor, causes the processor to perform:
acquiring a target face image, and performing face key point detection on the target face image to acquire a face key point detection result;
determining a face visible area which is not subject to an occluder and a face invisible area which is subject to the occluder in the target face image; and
acquiring a target fusion image by fusing a virtual special effect and a face part matched in the target face image based on the face key point detection result, the face visible area and the face invisible area; and
wherein the processor is caused to further perform:
acquiring a first fusion image by fusing the virtual special effect and the face part matched in the target face image based on the face key point detection result; and generating the target fusion image base on the face visible area, the face invisible area and the first fusion image; and wherein the processor is caused to further perform:

retaining the virtual special effect in the face visible area of the first fusion image; and acquiring the target fusion image by drawing the occluder on the face invisible area of the first fusion image in a fashion of being placed on a top layer.

9. The electronic device according to claim 8, wherein the at least one instruction, when executed by the processor, causes the processor to further perform:

acquiring an occlusion mask of the target face image, wherein the occlusion mask is configured to indicate the face visible area which is not subject to the occluder and the face invisible area which is subject to the occluder in the target face image; and generating the target fusion image based on the occlusion mask and the first fusion image.

10. The electronic device according to claim 9, wherein the at least one instruction, when executed by the processor, causes the processor to further perform:

acquiring the face visible area and the face invisible area by semantically segmenting the target face image based on an image semantic segmentation model; and generating the occlusion mask of the target face image, wherein in the occlusion mask, pixels taking a first value are configured to indicate the face visible area, and pixels taking a second value are configured to indicate the face invisible area.

11. The electronic device according to claim 10, wherein the image semantic segmentation model is trained by:

acquiring a training sample image and a label segmentation result of the training sample image, wherein the training sample image comprises an image in which a face area is subject to the occluder;

inputting the training sample image into a deep learning model;

determining, based on a target loss function, whether a predicted segmentation result of the training sample image output by the deep learning model matches the label segmentation result or not; and acquiring the image semantic segmentation model by iteratively updating network parameters of the deep learning model until the deep learning model converges in response to the predicted segmentation result not matching the label segmentation result.

12. The electronic device according to claim 9, wherein the at least one instruction, when executed by the processor, causes the processor to further perform:

determining the face visible area and the face invisible area in the first fusion image based on the occlusion mask;

retaining the virtual special effect in the face visible area of the first fusion image; and acquiring the target fusion image by drawing the occluder on the face invisible area of the first fusion image in a fashion of being placed on a top layer.

13. The electronic device according to claim 8, wherein the at least one instruction, when executed by the processor, causes the processor to perform:

determining the face part matching the virtual special effect;

fitting a target location area in the target face image based on the face key point detection result and the determined face part; and acquiring the first fusion image by fusing the virtual special effect and the target location area of the target face image.

14. The electronic device according to claim 8, wherein the at least one instruction, when executed by the processor, causes the processor to perform:

performing face detection on an acquired image; and acquiring the target face image by cropping a face area based on a face detection result in response to the acquired image comprising a face.

15. A non-transitory computer-readable storage medium storing at least one computer program including at least one instruction, wherein the at least one instruction, when executed by a processor of an electronic device, causes the electronic device to perform:

acquiring a target face image, and performing face key point detection on the target face image to acquire a face key point detection result;

determining a face visible area which is not subject to an occluder and a face invisible area which is subject to the occluder in the target face image; and acquiring a target fusion image by fusing a virtual special effect and a face part matched in the target face image based on the face key point detection result, the face visible area and the face invisible area; and wherein the processor is caused to further perform:

acquiring a first fusion image by fusing the virtual special effect and the face part matched in the target face image based on the face key point detection result; and generating the target fusion image base on the face visible area, the face invisible area and the first fusion image; and wherein the processor is caused to further perform:

retaining the virtual special effect in the face visible area of the first fusion image; and acquiring the target fusion image by drawing the occluder on the face invisible area of the first fusion image in a fashion of being placed on a top layer.

* * * * *